Figure 1:
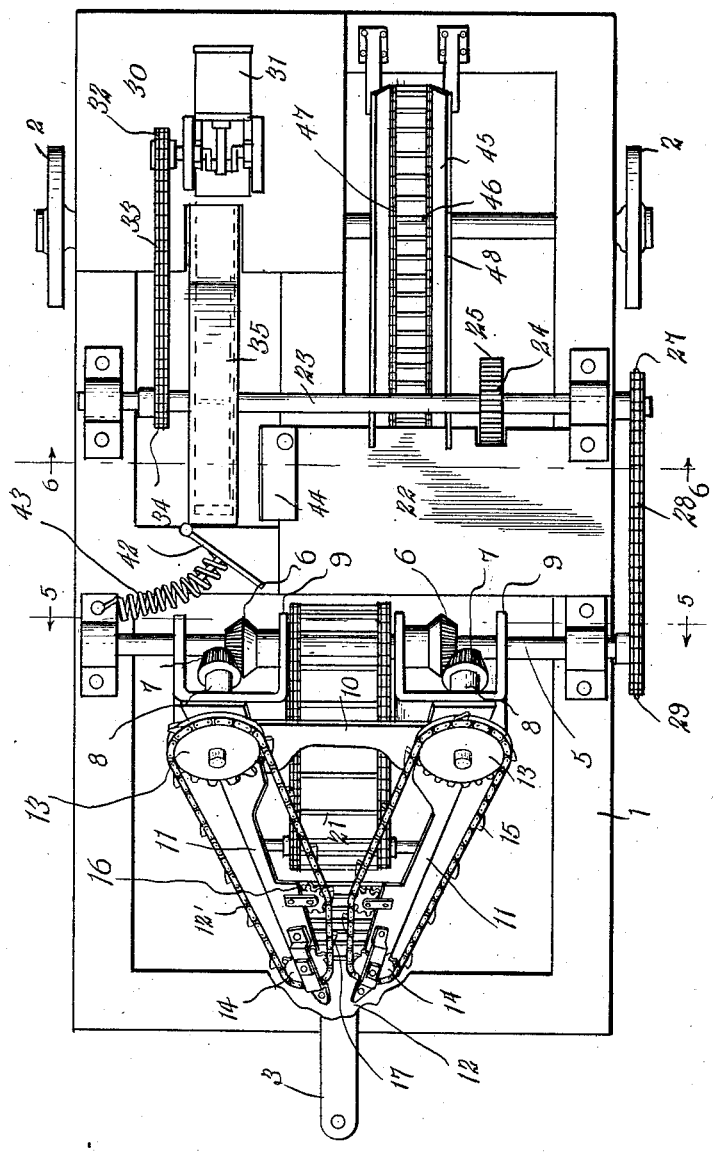

July 21, 1931.  W. C. GOOKIN  1,815,503
BEET TOPPER
Filed Nov. 28, 1928   3 Sheets-Sheet 1

Inventor
W. C. Gookin

By Lacey & Lacey, Attorneys

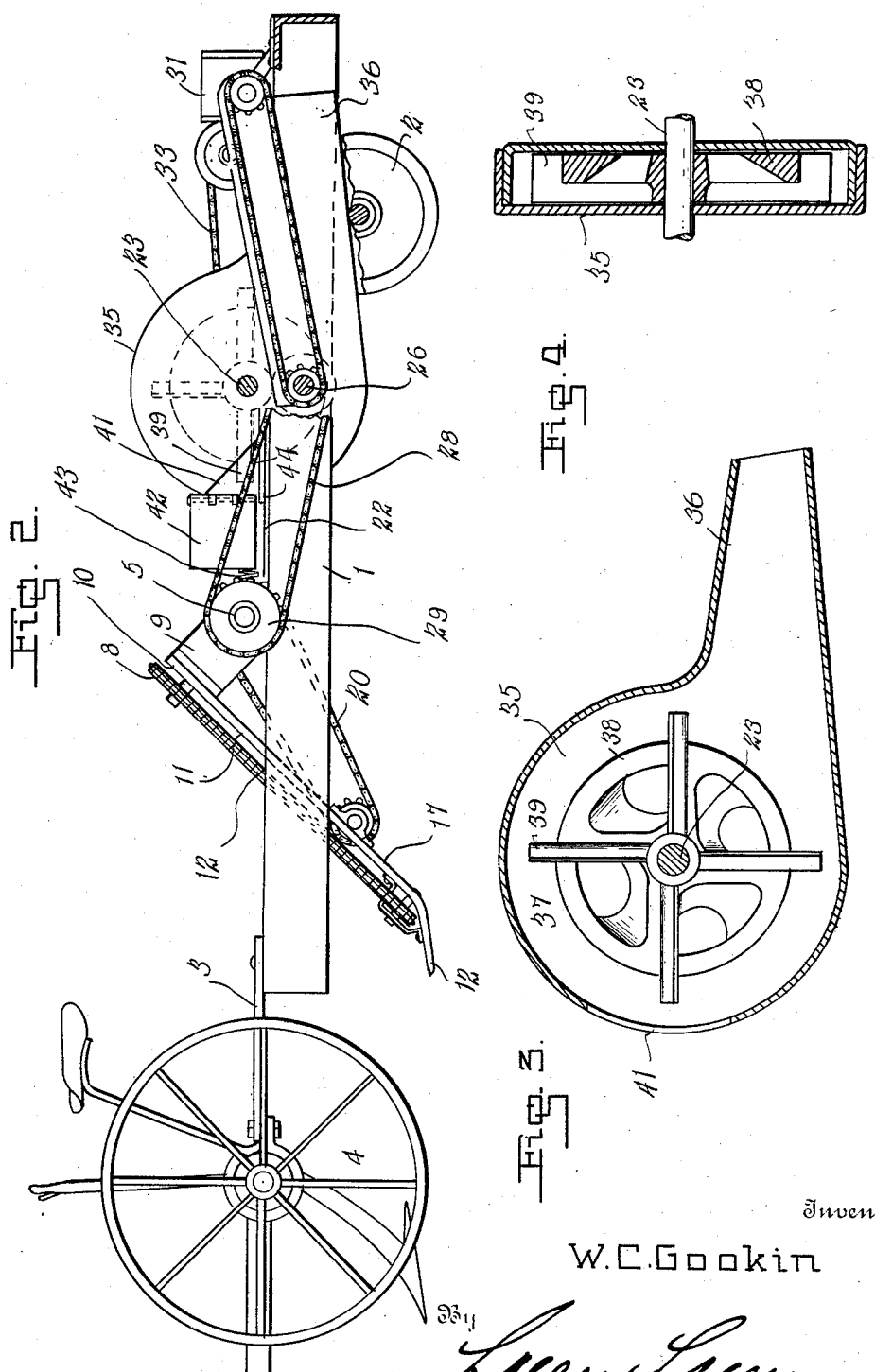

July 21, 1931.  W. C. GOOKIN  1,815,503
BEET TOPPER
Filed Nov. 28, 1928  3 Sheets-Sheet 3

Inventor
W. C. Gookin

By Lacey & Lacey, Attorneys

Patented July 21, 1931

1,815,503

UNITED STATES PATENT OFFICE

WILLIAM C. GOOKIN, OF CORYDON, IOWA

BEET TOPPER

Application filed November 28, 1928. Serial No. 322,446.

The object of this invention is to provide a simple compact machine which may be drawn behind a beet lifter or harvester and utilized to remove the tops at a uniform height. The invention provides means whereby the beets will be taken from the ground and delivered to a platform from which they may be pressed against a topping knife and then delivered to a receptacle carried at the rear of the machine or deposited on the ground in a row, the severed tops being delivered into a separate receptacle or deposited in a separate row. The invention is illustrated in the accompanying drawings and will be hereinafter fully set forth.

Figure 5:
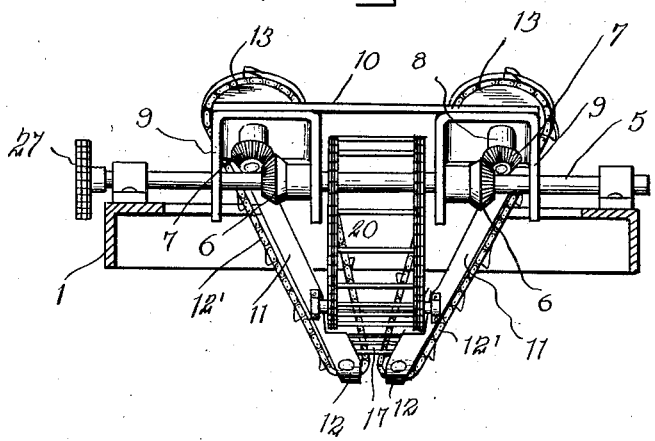
Figure 6:
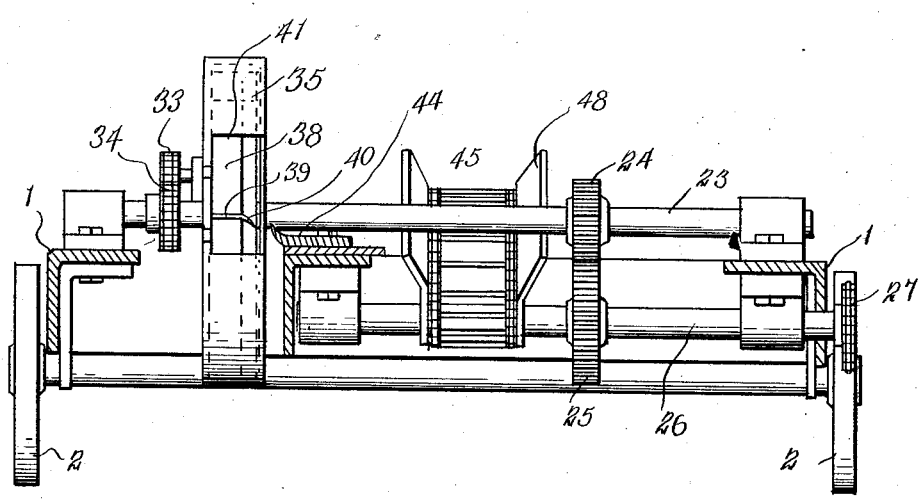

In the drawings:

Figure 1 is a plan view, partly broken away, of a machine embodying the present invention, Fig. 2 is a side elevation of the same, partly broken away and in section, Fig. 3 is an enlarged longitudinal section through the knife and its casing, Fig. 4 is a transverse section of the knife, Fig. 5 is a transverse section on the line 5—5 of Fig. 1, and Fig. 6 is a transverse section on the line 6—6 of Fig. 1.

In carrying out the invention, there is provided a frame 1 preferably of rectangular formation and supported at or near its rear end upon ground wheels 2, a draft bar or coupling 3 being secured to the front end of the frame and adapted to be bolted or otherwise secured to a beet-lifting machine, indicated conventionally at 4, which may be of any approved type. At a point between the ends of the frame, a shaft 5 is mounted thereon in suitable bearings, and upon this shaft are secured beveled gears 6 meshing with beveled pinions 7 formed on the rear lower ends of shafts 8 which are journaled in brackets 9 mounted upon the shaft 5, as shown. The brackets 9 are preferably U-shaped stirrups, to the shoulders of which are secured the upper ends of a yoke or frame 10 which has a rear member extending transversely of the machine between the shafts 8 and supporting the upper ends thereof, as shown most clearly in Fig. 1, and downwardly and forwardly converging side arms 11, also shown in Fig. 1. The lower forward ends of the arms 11 are formed into or have secured thereon shoes or runners 12 which are forwardly tapered and are adapted to run upon the ground at the sides of a row of lifted beets and past the beets so as to raise the same and present them to the conveyer chains 12'. The chains 12' are trained around driving sprockets 13 secured on the upper forward ends of the shafts 8 and around pinions 14 mounted upon the front faces of the side arms adjacent the runners, as clearly shown, and the chains are provided at intervals with lugs or projections 15 which are adapted to engage behind the beet bodies and push them upwardly and rearwardly. Referring particularly to Fig. 1, it will be noted that the inner runs of the chains are parallel at their forward portions and extend longitudinally of the machine, idlers 16 being provided to hold the chains in the desired paths. Extending between the side arms 11 below the forward portions of the inner runs of the chains are cross rods 17 which are spaced apart so that they form a screen or grid over which the beets and tops will be drawn and through which any sand or dirt which may be taken up with the beets may drop to the ground. Immediately in rear of the idlers 16, a cross shaft 18 is mounted in suitable bearings upon the side arms 11 and extends between said arms, this shaft carrying a drum or sprocket 19 about which a conveyer 20 is trained. The conveyer 20, as shown most clearly in Figs. 1 and 5, comprises a pair of parallel sprocket chains trained about the sprocket or drum 19 and a belt extending between the chains and provided with ribs 21 which are adapted to engage behind the beets deposited upon the apron or belt and thereby carry the same upwardly and rearwardly. The rear bight of the conveyer is trained about sprockets secured upon the shaft 5 between the gears 6 so that said conveyer will be actuated by said shaft, and it will now be understood that the beets drawn from the ground and left upon the ground by the beet lifter 4 will be successively taken up by the points or runners 12.

At the rear of the shaft 5, a platform 22 is secured on the frame and at the rear of said platform is mounted a drive shaft 23 extending across the machine and equipped with a pinion 24 meshing with a gear 25 on a counter-shaft 26 disposed immediately below the driving shaft 23. On the end of the counter-shaft is a sprocket 27 and a chain 28 is trained about said sprocket and about a sprocket 29 on the end of the shaft 5 so that the motion of the drive shaft will be transmitted to the conveyer actuating shaft 5. At the rear of the frame is a platform 30 upon which is mounted a small motor 31, preferably of the internal combustion type, and upon the crank shaft of this motor is secured a sprocket 32, a chain 33 being trained about said sprocket and a sprocket 34 on the drive shaft 23. Extending longitudinally of the frame at one side thereof and at the inner side of the chain 33 and the sprockets about which it is trained is a blower casing 35, the forward portion of which constitutes a housing disposed concentrically about the shaft 23 and having a rearwardly directed discharge spout 36. Within the housing 35 is a combined fan and cutter 37 consisting of a disk or flywheel 38 and blades 39 which are disposed radially of the flywheel and project from the inner side thereof, the projecting edges of the blades being curved forwardly in the direction of rotation and beveled to constitute knives, as shown most clearly at 40. At the front end of the casing 35 is an opening 41 which extends into the side of the casing, as shown in Figs. 2 and 6, through which the beet tops are presented to the action of the knife and immediately adjacent said opening is a gate or presser plate 42 which is hingedly mounted and is normally pressed inwardly by an expansion spring 43 fitted to the outer side of the gate and to any fixed point on the frame. Upon the platform 22 adjacent the housing 35 is a plate 44 constituting a rest upon which the beet bodies may be held while the tops are exposed to the cutter.

At the inner side of the housing and extending rearwardly from the platform 22 is a conveyer 45 which has its front end mounted upon the shaft 26 and its rear end supported at the rear end of the frame. This conveyer may conveniently be in the form of an endless belt or apron 46 equipped with cross bars 47 and operating longitudinally in a trough 48.

It is thought the operation of the machine will be readily understood from the foregoing description taken in connection with the accompanying drawings. An operator is seated upon the platform 22 and as the machine travels over the field the beet bodies with the tops thereon will be delivered onto said platform within convenient reach of the operator. The operator grasps the beets singly and presses the tops thereof through the opening 41 into the paths of the knives 39 so that the tops will be removed. The presser plate 42 holds the tops within the casing so that they will not be thrown outwardly by the action of the fan and cutter but will be held in the path of the cutters so that the tops will be severed, and the several blades will push the severed tops downwardly and rearwardly through the casing. The shaft 23 is operated by the motor 31 and the motion of the shaft is, of course, transmitted through the described gearing to the several working instrumentalities. The disk or flywheel 38 with the blades 39 will rotate at a high speed and will, consequently, act as a fan or blower so that a strong draft will be created through the housing 35 from the opening 41 toward the end of the discharge spout 36, the tops being thereby blown rearwardly to be delivered onto the ground or into a receptacle carried by the rear end of the frame. As the tops are severed, the operator will place the beet bodies within the conveyer 45 upon the endless belt 46 and said belt, traveling rearwardly, will carry the bodies to the rear end of the frame where they may be disposited in a receptacle or on the ground.

It will be readily seen that I have provided a very compact machine which will be of light draft but will be strong, durable and efficient. The beets being held to the cutter by manual manipulation, the removal of excessive portions or insufficient portions will be avoided and the severed tops will be carried rearwardly and discharged without any attention on the part of the operator. No appreciable strain is caused the operator by the presentation of the beets to the cutter and waste which is incidental to automatic machines is avoided.

Having thus described the invention, I claim:

A beet topper comprising a portable frame, a platform thereon, a conveyer for topped beets leading rearwardly from the platform, a housing adjacent an end of the platform, said housing including a front cylindrical portion and a tubular portion leading rearwardly from said cylindrical portion and having an open rear end and the cylindrical portion having an opening through its front wall and a side wall, a rotatable fan within the cylindrical portion of the housing, cutting blades disposed radially on the fan with their cutting edges presented to the side of the housing to move across the opening therein for removing beet tops inserted through said opening, the tops being discharged by the fan through the open rear end of the housing, a rest plate for beet bodies on the platform adjacent the housing, a presser plate hinged adjacent the front of the housing to bear upon the beets inserted in the opening in the housing, and a spring acting on said plate to hold it yieldably toward the housing and prevent beet tops being thrown through the front of the housing.

In testimony whereof I affix my signature.

WILLIAM C. GOOKIN. [L. S.]